Feb. 11, 1936. F. L. SCOTT 2,030,722
CUTTER ASSEMBLY
Filed Dec. 1, 1933

Floyd L. Scott INVENTOR.
BY Jesse R. Stone
ATTORNEYS.

Patented Feb. 11, 1936

2,030,722

UNITED STATES PATENT OFFICE 2,030,722

CUTTER ASSEMBLY

Floyd L. Scott, Houston, Tex., assignor to Hughes Tool Company, Houston, Tex., a corporation of Texas Application December 1, 1933, Serial No. 700,503

7 Claims. (Cl. 255—73)

My invention relates to cutters for well drills and includes the complete assembly of shaft, bushing, cutter and securing means therefor.

The device forming my invention is capable of general application but is particularly adapted for use in a multistage drill where each stage above the first stage acts to enlarge the hole cut by the preceding stage.

It is an object of the invention to provide an assembly of cutter with bushing, rolling bearings, and washer thereon capable of being inserted in position as a unit, so as to receive the bearing shaft.

I further desire to provide means to lock the assembly in position on a bit head and prevent detachment by the same in use.

It is a further object to so arrange and mount the cutter upon the head that it will be most effectively flushed clear of material tending to clog its operation.

I have a further object to provide means to retain the assembly in position in case the supporting portion of the bit head becomes worn about the cutter shaft.

I also desire to provide an assembly structure of the character noted that is held rigidly against movement longitudinally of the cutter shaft while in operation.

The invention also includes a provision to assure the retention of the parts in position during operation.

In the drawing herewith Fig. 1 is a central longitudinal section through a multiple stage drill head with my invention employed thereon.

Figures 1, 2, 3, 4, 5, 6, 7:
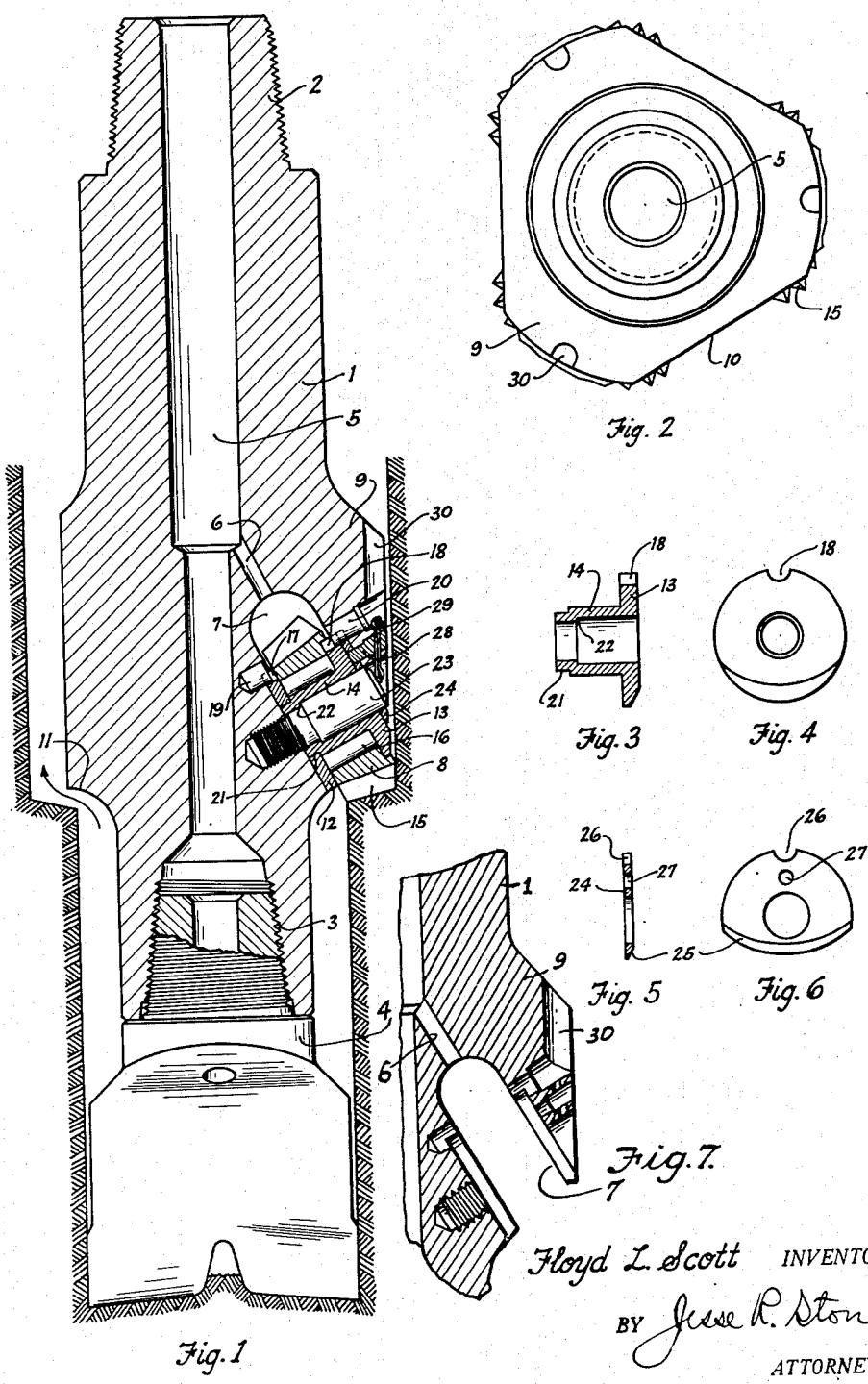
Fig. 2 is a top plan view of the drill shown in Fig. 1.
Figs. 3 and 4 are longitudinal section and end elevation respectively of the cutter bushing.
Figs. 5 and 6 are longitudinal section and front elevation respectively of the retaining washer which I have adopted.
Fig. 7 is a broken sectional detail of the head with the cutter and its support removed.

In Fig. 1 is shown a two stage bit including a head 1, having an upper threaded shank 2 for attachment to a next upper stage or to a drill collar or coupling. Its lower end is formed with a threaded connection 3 with the lower stage bit 4 and I have shown an ordinary fish tail bit of common construction employed as the pilot drill. Longitudinally of the head 1 and pilot bit 4 is a passage 5 for flushing fluid; and branch passages 6 lead from this passage to the slots 7 in which the cutters 8 are mounted.

The head 1 is enlarged between its ends to furnish stock for mounting the cutters. This enlarged portion 9 is flattened on three sides, as shown in Fig. 2, to provide space along the flattened sides 10 for the free passage upwardly of the flushing fluid.

Between the flattened areas the lower side of the enlarged portion 9 is formed with a curved shoulder 11 to deflect the flushing fluid laterally as will be later noted. Slots 7 are cut in said shoulders directed upwardly and inwardly. The walls of each slot 7 are recessed to receive the washer 12, and the flange 13 upon the bushing 14.

The cutter 8 is shown as an approximately ring-shaped member, the outer periphery of which is formed with cutting teeth 15 tapered inwardly. Said cutter rolls upon roller bearings 16 seated upon the bushing 14. Said rollers bear against the bushing flange 13 at one end and against the washer 12 at the other, and during operation both the flange and washer are stationary. The washer 12 is notched at 17 and the bushing flange is notched at 18 to inter-fit with dowels 19 and 20 respectively. These dowels are aligned so that the openings in which they fit may be drilled in one operation.

The inner washer fits over a slightly reduced portion 21 upon the inner end of the bushing and the interior of the bushing has a slight shoulder at 22 so that when a shaft 23 is extended through said bushing with its assembled bearings, washer, and cutter mounted thereon, the inner threaded end of the shaft may be screwed tightly into the head to hold said assembly rigidly against movement longitudinally of the shaft.

The recess in the outer wall of the slot 7 also accommodates a retaining washer 24, through which the shaft 23 extends. The shape of this retaining washer is seen in Figs. 5 and 6. Its lower side is cut away and beveled at 25 so that its lower edge will be flush with the outer face of the head. Its upper edge is notched at 26 to fit about the dowel 20. It has an opening 27 to receive a supporting pin 28 extended through an opening in the head and held in position by means of a cotter pin 29, or equivalent means. The inner end of the pin 28 abuts against the bushing 14 and the outer end lies flush with the surface of the head. The head above the cotter pin 29 is grooved vertically at 30 to allow the insertion of the cotter pin 29. Said cotter pin projects into the opening through which the cutter shaft 23 is inserted and bears against the head of the inserted shaft, thus tending to prevent unscrewing of said shaft.

In the use of this invention the bushing 14 with the roller bearings 16, the cutter 8, and the washer 12 are assembled with the notches in the washer and bushing engaged with the dowels 19 and 20 thus holding these parts from rotation. After insertion into the slot and engaging with the dowels, the washer 24 is placed in position and the cutter shaft is inserted and screwed tightly in the head to retain the assembly against longitudinal movement. The pin 28 is then inserted through the retaining washer 24 and is locked against movement therefrom by the cotter pin 29. This cotter pin acts to hold the retaining pin 28 and also to prevent unscrewing of the cutter shaft. If the bit head wears about the outer end of the cutter shaft in such manner as to remove the support below the shaft, the retaining washer will support the shaft. Whenever the driller has occasion to remove the bit he can tell by inspection whether the retaining washer is also worn and if it is, said washer may be removed and a new one substituted. In this way the support for the outer end of the cutter shaft may be assured even where the bit head is worn.

The cutter is firmly supported on roller bearings and cannot be moved longitudinally in the socket and will always remain properly centered. The thrust inwardly and upwardly will be taken by the head through the washer and bushing and little weight will be taken by the shaft itself.

It is further to be noted that the cutters upon the head project from the shoulders thereon so as to be washed by the flushing fluid passing upwardly from the pilot drill. I space the curve on the inner side of the shoulder so that it is above the track cut by the cutter and form this shoulder to deflect the fluid against the cutter and wash it free of material. This supplements the flushing fluid entering the upper end of the cutter slot and assists materially in preventing the clogging of the cutter with material.

What I claim as new is:

1. A bit having a head, a lower shoulder thereon, an upwardly and inwardly directed cutter slot in said shoulder, a cutter bushing, bearings thereon, a cutter on said bearings, means on said bushing to retain said bearings and cutter thereon, a cutter shaft adapted to be screwed into said head at one end and support said bushing and cutter in said slot and a removable plate in a recess in said slot adjacent said bushing to support the outer end of said shaft.

2. A device such as is set out in claim 1, with means to prevent removal of said removable plate during operation.

3. A device such as is set out in claim 1 in combination with a retaining pin in said removable plate and a cotter pin to secure both said retaining pin and said cutter shaft in a position in said bit head.

4. A multiple stage drill including a head, a shoulder on said head, a cutter assembly set in an upwardly and inwardly directed slot in said shoulder, said assembly including a shaft, a bushing, roller bearings, and a toothed cutter, a flange at one end of said bushing, a washer mounted on the other end of said bushing whereby said bushing, roller bearing, cutter, and washer may be assembled and handled as a unit, means to prevent rotation of said bushing and washer, and means to prevent outward movement of said shaft from said head.

5. A well drill including a head, having an upwardly directed slot, a cutter shaft transversely of said slot and screwed at its inner end into said head, a cutter rotatably mounted on said shaft, a washer supporting the outer end of said shaft, and means to detachably support said washer in said head.

6. A well drill including a head, having an upwardly directed slot, a cutter shaft transversely of said slot and screwed at its inner end into said head, a cutter rotatably mounted on said shaft, a washer supporting the outer end of said shaft, a retaining pin extending into said head and through said washer to support the same in said head, and means to removably secure said retaining pin in position.

7. A well drill including a head having a slot therein, a cutter shaft transversely of said slot, a cutter rotatably mounted on said shaft, a washer in the side of said slot and supporting the outer end of said shaft, a retaining pin in said head extending through and supporting said washer, and a cotter pin extending through said pin and bearing against the end of said shaft.

FLOYD L. SCOTT.